United States Patent
Lempel

(10) Patent No.: US 10,105,595 B2
(45) Date of Patent: Oct. 23, 2018

(54) FANTASY SPORTS WITH SITUATIONAL SUBSTITUTIONS OF PLAYERS

(71) Applicant: OATH INC., New York, NY (US)

(72) Inventor: Ronny Lempel, Haifa (IL)

(73) Assignee: OATH INC., New York, NY (US)

( * ) Notice: Subject to any disclaimer, the term of this patent is extended or adjusted under 35 U.S.C. 154(b) by 581 days.

(21) Appl. No.: 13/928,100

(22) Filed: Jun. 26, 2013

(65) Prior Publication Data

US 2015/0005072 A1    Jan. 1, 2015

(51) Int. Cl.
  *A63F 13/828* (2014.01)
  *A63F 13/30* (2014.01)
  *A63F 13/65* (2014.01)
  *A63F 13/69* (2014.01)

(52) U.S. Cl.
  CPC .............. *A63F 13/30* (2014.09); *A63F 13/65* (2014.09); *A63F 13/69* (2014.09); *A63F 13/828* (2014.09)

(58) Field of Classification Search
  CPC .......................... A63F 13/65; A63F 2300/8052
  See application file for complete search history.

(56) References Cited

U.S. PATENT DOCUMENTS

| | | | | |
|---|---|---|---|---|
| 6,198,511 B1 * | 3/2001 | Matz | ...................... | H04N 5/445 348/473 |
| 6,292,706 B1 * | 9/2001 | Birch | ...................... | A63F 13/12 273/317.6 |
| 6,475,084 B2 * | 11/2002 | Tanibuchi | ............... | A63F 13/10 463/3 |
| 7,988,560 B1 * | 8/2011 | Heller | ....................... | A63F 9/24 463/40 |
| 8,509,929 B1 * | 8/2013 | Hughes | ............... | A63F 11/0074 463/42 |
| 2003/0123850 A1 * | 7/2003 | Jun | .................... | G06F 17/30796 386/343 |
| 2003/0203757 A1 * | 10/2003 | Chanda | .................... | A63F 13/12 463/42 |
| 2004/0043724 A1 * | 3/2004 | Weast | .................... | H04N 5/782 455/3.01 |
| 2004/0266535 A1 * | 12/2004 | Reeves | .................... | A63F 13/12 463/42 |
| 2007/0022029 A1 * | 1/2007 | Ma | ......................... | G06Q 40/02 705/35 |

(Continued)

*Primary Examiner* — Damon Pierce
(74) *Attorney, Agent, or Firm* — James J. DeCarlo; Greenberg Traurig, LLP

(57) ABSTRACT

Disclosed is a method and system for situational substitutions in fantasy sports. A server maintains personnel packages received from a client device operated by a user owning a fantasy team that includes a default personnel package and zero or more situational personnel packages of fantasy players. Each situational personnel package includes fantasy players and is associated with a specific situation that might occur within a real life sports game. The server detects a specific real life sports game situation matching the specific situation associated with a situational personnel package. Based on this detection, the server substitutes the fantasy player(s) in the situational personnel package for one or more of the fantasy players in the default package. The server determines a score for the fantasy team based on points accrued by fantasy players in the default personnel package and the substituted one or more fantasy players in the personnel package.

19 Claims, 6 Drawing Sheets

200

| Player 210 | Position 220 | Game Situation to Play 230 |
|---|---|---|
| Tom Brady | Quarterback | Default |
| Frank Gore | Running Back | Goal Line |
| Larry Fitzgerald | Wide Receiver | 3rd and Long |
| Adrian Peterson | Running Back | Default |
| Calvin Johnson | Wide Receiver | 3rd and Long |

300

| Player 305 | Always on Field? 310 | Otherwise, Situational Packages 320 |
|---|---|---|
| Tom Brady | Yes | |
| Adrian Peterson | No | Default, 4th and short, goal-line |
| Larry Fitzgerald | No | 3rd and Long |

(56) References Cited

U.S. PATENT DOCUMENTS

| | | | | |
|---|---|---|---|---|
| 2007/0072679 A1* | 3/2007 | Kerns | A63F 13/10 | 463/42 |
| 2007/0204308 A1* | 8/2007 | Nicholas | H04N 7/173 | 725/86 |
| 2008/0126476 A1* | 5/2008 | Nicholas | G06Q 10/10 | 709/203 |
| 2008/0161113 A1* | 7/2008 | Hansen | A63F 13/12 | 463/42 |
| 2009/0062941 A1* | 3/2009 | Biniak | A63B 24/0062 | 700/91 |
| 2010/0279754 A1* | 11/2010 | Tanenbaum | G06Q 50/34 | 463/3 |
| 2011/0230243 A1* | 9/2011 | Hereford | G07F 17/32 | 463/1 |
| 2011/0237333 A1* | 9/2011 | Otomo | A63F 13/812 | 463/42 |
| 2011/0263306 A1* | 10/2011 | Nakamura | A63F 13/10 | 463/4 |
| 2012/0149473 A1* | 6/2012 | Moore | G07F 17/3237 | 463/42 |
| 2012/0159536 A1* | 6/2012 | Treacy | G06Q 30/00 | 725/32 |
| 2012/0270619 A1* | 10/2012 | Nicholas | A63F 13/12 | 463/9 |
| 2013/0053989 A1* | 2/2013 | Miller | A63F 13/67 | 700/91 |
| 2013/0079073 A1* | 3/2013 | Sharifi | G07F 17/32 | 463/3 |
| 2013/0258191 A1* | 10/2013 | Eyer | H04N 7/0882 | 348/468 |
| 2014/0045595 A1* | 2/2014 | Baschnagel, III | A63F 13/10 | 463/40 |
| 2014/0194173 A1* | 7/2014 | Nicholas | A63F 13/005 | 463/9 |
| 2014/0274411 A1* | 9/2014 | Moffett | A63F 13/30 | 463/42 |
| 2015/0005072 A1* | 1/2015 | Lempel | A63F 13/65 | 463/42 |

* cited by examiner

FANTASY SPORTS WITH SITUATIONAL SUBSTITUTIONS OF PLAYERS

FIELD

The present disclosure relates to fantasy sports, and more specifically to situational substitutions of players.

BACKGROUND

Fantasy sports leagues have become extremely popular. In a fantasy sport league, people (also referred to below as users or owners) draft real-life sports players for their fantasy teams. The drafted real-life sports players can be on the same real-life team or different real-life teams. The players then accrue points for the fantasy sports team depending on how the real-life sports player does in his or her sport in real life. For example, a person that is part of a football fantasy sports league may draft Tom Brady to play quarterback and Adrian Peterson to play running back on the person's fantasy sports team. When Tom Brady passes for 300 yards in a real-life football game, Tom Brady may earn 300 points (or some percentage of 300) for the person's fantasy sports team. Similarly, when Adrian Peterson rushes for 200 yards in a real-life football game, Adrian Peterson may accrue 200 points (or some percentage of 200) for the person's fantasy sports team. The fantasy sports league has several teams owned and managed by several people, and the winner of the fantasy league is the person (or people) whose team accrues the most points during the season.

SUMMARY

In one aspect, the disclosure relates to a method and system for situational substitutions in fantasy sports. A server computer maintains a personnel package received from a client device operated by a user owning a fantasy sports team. The fantasy sports team includes a default personnel package of fantasy sports players, and zero or more situational personnel packages of fantasy sports players. Each personnel package can include one or more fantasy sports players on the fantasy sports team and is associated with a specific situation that might occur within a real life sports game. In one embodiment, the players specified in a personnel package may be expressed explicitly. In another embodiment, the players specified in a situational personnel package may be expressed by reference to the default package by substituting a subset of players from the default personnel package with other players drafted by the same team owner.

The server computer detects a specific real life sports game situation matching the specific situation associated with one of the situational personnel packages. Based on this detection, the server computer substitutes the players of the default personnel package for the fantasy sports players expressed in the situational personnel package. The server computer determines a score for the fantasy sports team based on points accrued by fantasy sports players in the situational personnel package. When the server computer detects a specific real life sports game situation that does not match any specific situation associated with one of the situational personnel packages, the server computer determines a score for the fantasy sports team based on points accrued by fantasy sports players in the default personnel package.

In one embodiment, the server receives, from the user operating the client device, an indication of the fantasy sports players in the personnel package. In one embodiment, the server receives, from the user operating the client device, an indication of the specific situation associated with the personnel package. The server can receive, from the user operating the client device, a default personnel package including fantasy sports players that play unless the specific real life sports game situation, expressed in one of the situational personnel packages, occurs.

The specific real life sports game situation may be, for example, a third-and-long situation in a football game, a goal-line situation in a football game, or a $4^{th}$ and inches situation in a football game.

In one embodiment, the server maintains a list of specific real life sports game situations for comparison with the specific situation. The maintaining of the list may include maintaining a list based on down and distance, field position, point differential, game clock, real team record, etc. The maintaining of the list may include obtaining a priority for situations in the list of specific real life sports game situations.

In one embodiment, the fantasy sports players in the personnel package are scored during the situation associated with the active personnel package.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
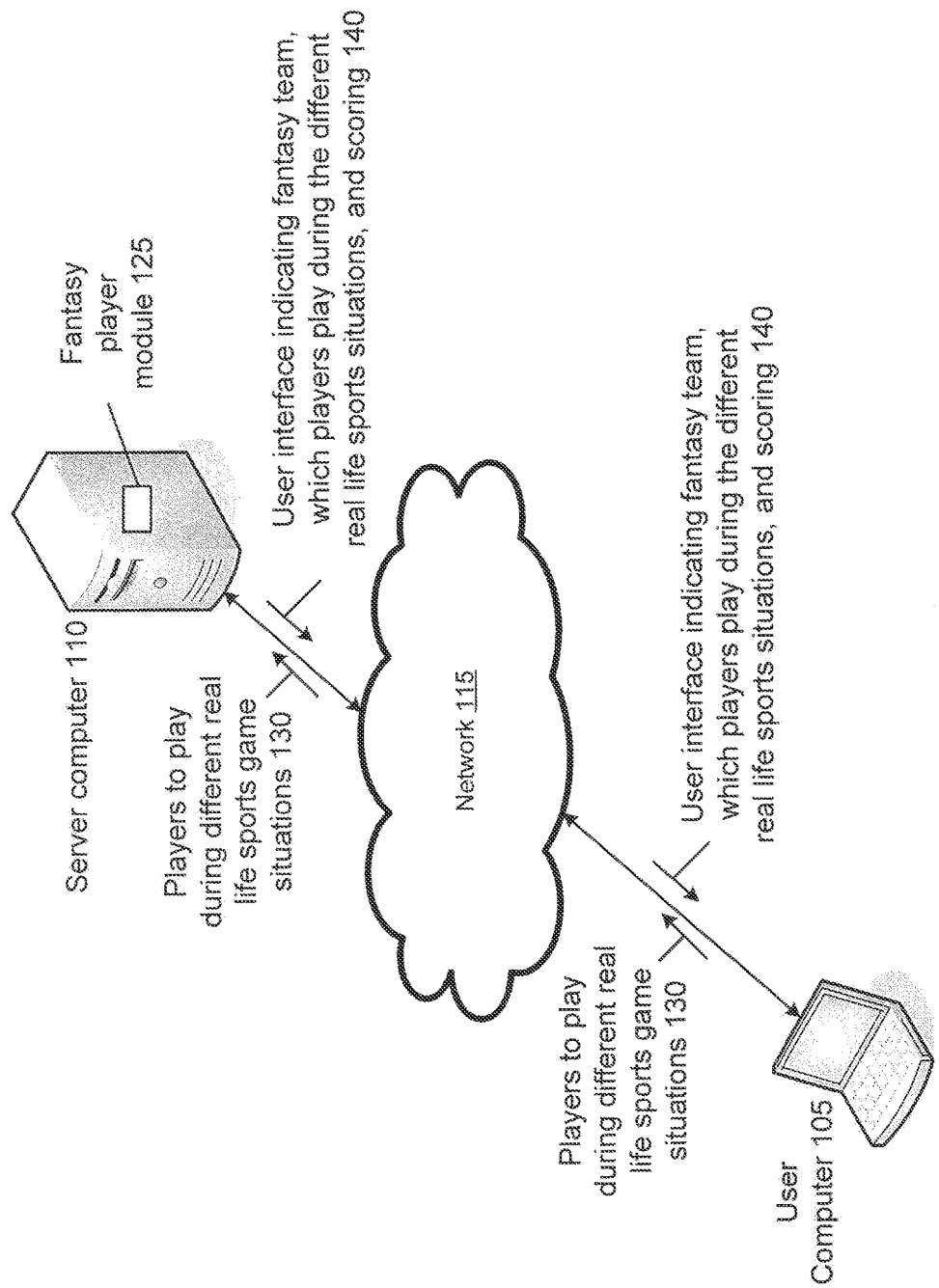
FIG. 1 is a block diagram of a user computer communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a block diagram of an embodiment of a user computer 105 communicating with a server computer 110 that can be utilized to provide user access to one or more fantasy sports applications. Server 110 would generate and/or serve web pages, for example, to be displayed by a browser (not shown) of user computer 105 over a network 115 such as the Internet. In one embodiment, an owner of a fantasy sports team uses the user computer 105 to manage his or her fantasy sports team.

The user uses the user computer 105 to create and manage his or her fantasy sports team via a fantasy player module 125. The fantasy player module 125 can provide a user interface (e.g., via a web page) to the user computer 105 for the user to create or manage his or her fantasy sports team. In one embodiment, the user maintains the fantasy sports team, which can include active players that accumulate points for the user's fantasy sports team during real life sports games, and bench players that do not currently accumulate points but who the user can substitute into his or her active players at various times (e.g., injury of an active player).

Although football is used as an example of a fantasy sport in which the fantasy player module 125 is used, the fantasy player module 125 can be used with any team sport (e.g., baseball, basketball, hockey, etc.). Each fantasy league has settings for the set of positions each team must fill. In one embodiment, there is an approved set of players which is common across all fantasy football leagues, based on the players who play in the National Football League (NFL). Each one of those approved players can fill one or more positions. For example, a fantasy league may require a user to start a quarterback (QB), two running backs (RBs), three wide receivers (WRs), one tight-end (TE), one kicker (K), and one defensive end/safety (D/ST) each week. In one embodiment, these settings are customizable. In certain leagues, users fill their teams with 15 of the approved players, and they can draw from any of these 15 to fill all of the player slots each week. Certain leagues have a scoring system which runs for 17 weeks, coinciding with weeks 1 through 17 in the NFL. The object of fantasy sports is to assemble a team that is optimized around a particular scoring system depending on the league a user participates in.

In one embodiment, the fantasy player module 125 enables the user to play different players based on different real life game situations. The user can select the players that the user wants to play during different situations and can then transmit the names of these players 130 to the server computer 110. The fantasy player module 125 can then transmit a user interface 140 to the user computer 105, where the user interface 140 indicates, for example, the fantasy team, which players play during the different real life sports situations, and/or scoring.

In one embodiment, drafts associated with forming a fantasy sports team enable team owners (users) to select a larger number of players than a typical fantasy sports team would have (due to each personnel package, as described below). During this draft (or at some point later), a user designates a default personnel package, which includes fantasy players that accumulate points for most plays.

Figure 2A:
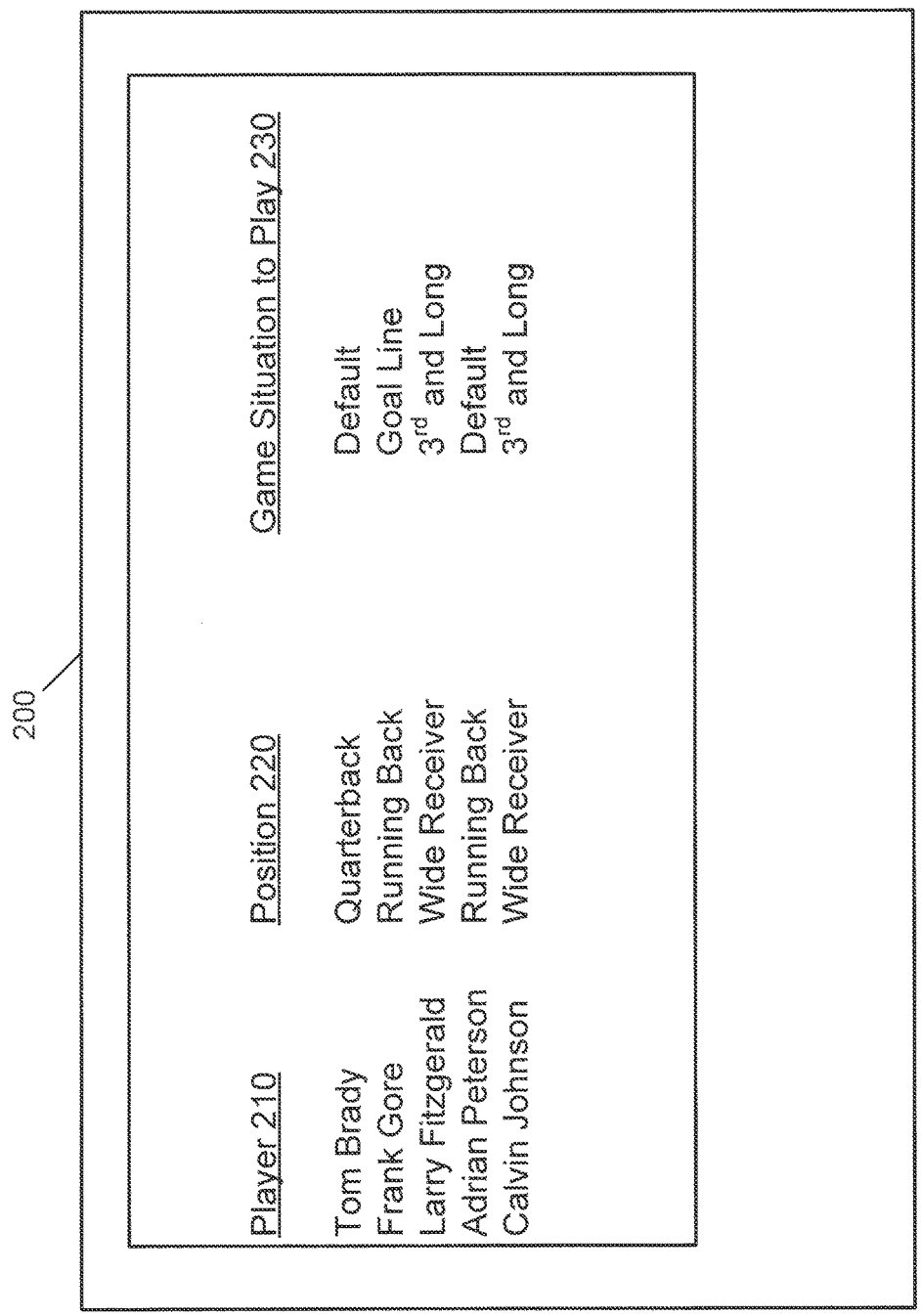
FIG. 2A is a block diagram of a user interface that lists players on a fantasy sports team, position of the listed players, and game situation to play the player in accordance with an embodiment of the present disclosure.

The user may have different personnel packages for different real life game situations. Each personnel package is associated with a specific situation that may occur within a real life sports game. For example, FIG. 2A is a block diagram showing a user interface 200 that lists players 210 on a fantasy sports team, position 220 of the listed players, and game situation 230 to play the player. Although three items 210, 220, 230 are shown listed in user interface 200, any number of items can be listed.

In one embodiment and as stated above, there is a default personnel package that includes players who accumulate points on the user's fantasy sports team for most situations. There can then be other personnel packages for other situations. In one embodiment, these personnel packages are pre-set for users. In another embodiment, the user specifies different personnel packages. For example, there may be a goal line personnel package, a $3^{rd}$ and long personnel package, a $4^{th}$ and inches personnel package (for fantasy football). Personnel packages may be based on, for example, down and distance (e.g., $3^{rd}$ and long), field position (e.g., within 2 yards of the end-zone on offense), point differential, game clock, real team record, etc. In one embodiment, the distance that constitutes "long" in "$3^{rd}$ and long" is explicitly defined.

In one embodiment, different personnel packages may include different players at different positions. For example, a $3^{rd}$ and long personnel package may include several (or all) wide receivers. When this $3^{rd}$ and long situation occurs in a real life game, the players specified by this personnel package become the active lineup of the fantasy team. When this occurs, one or more running backs, for example, are removed from the fantasy team's active lineup and one or more wide receivers are placed into the fantasy team's active lineup instead. These substitutions occur in the fantasy team and may or may not occur in the real life football game. The personnel package specifies which substitutions take place in the fantasy team (e.g., first running back for wide receiver).

Running backs or full backs who, for instance, specialize in gaining short yardage would be good candidates for a goal line personnel package. Similarly, wide receivers who usually run long routes would be good candidates for a $3^{rd}$ and long personnel package. As shown in FIG. 2A, Frank Gore (RB) is listed as part of a goal line personnel package. Larry Fitzgerald (WR) and Calvin Johnson (WR) are listed as part of a $3^{rd}$ and long personnel package. Tom Brady (QB) and Adrian Peterson (RB) are listed as part of a Default personnel package.

Suppose the Minnesota Vikings have a $3^{rd}$ and 25 yards situation. As this is a $3^{rd}$ and long situation, the user's fantasy team substitutes Larry Fitzgerald for Adrian Peterson. Thus, during this play in the real Vikings game, any gain or loss by Adrian Peterson is ignored. Therefore, if, on this $3^{rd}$ and 25 yard play, the Vikings hand the ball off to Adrian Peterson and he runs for 30 yards to get a first down, the user's fantasy team does not accrue points for this run because of the substitution. Similarly, the user's fantasy team would accrue credit for Larry Fitzgerald's activities that occurred on third and long plays in the real-life game played by the Arizona Cardinals.

Figure 2B:
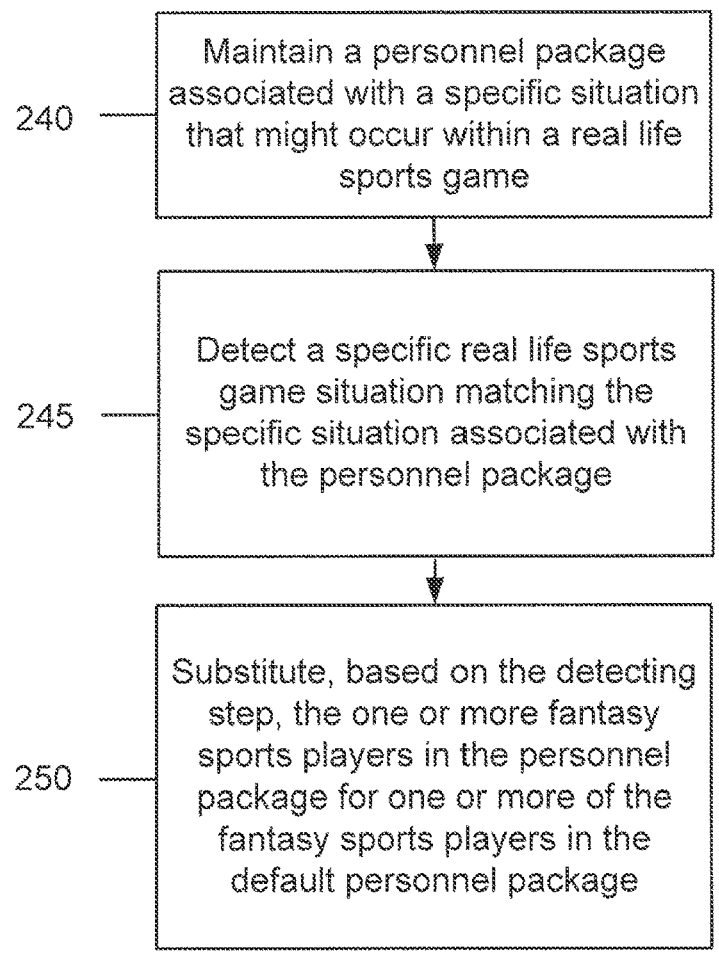
FIG. 2B is a flowchart illustrating steps performed by the server computer of FIG. 1 in accordance with an embodiment of the present disclosure.

FIG. 2B shows a flowchart illustrating an embodiment of steps performed by the fantasy player module 125. The fantasy player module 125 maintains a personnel package associated with a specific situation that might occur within a real life sports game (Step 240). In one embodiment, the server computer 110 receives an indication of the fantasy sports players in one or more personnel packages from the user computer 105. In one embodiment, the server computer 110 receives an indication of the specific situation associated with each personnel package.

In one embodiment, the fantasy player module 125 detects (e.g., during or after the occurrence of a real life sports game) a specific real life sports game situation matching the specific situation associated with the personnel package (Step 245). The detecting may occur after the real life game has been played, such as by parsing play-by-play logs associated with each game. In another embodiment, the detecting occurs based on an analysis of each game being played, such as by analyzing the closed captioning text of the game to determine the real life sports game situation(s). In one embodiment, the fantasy player module 125 determines the player's statistics by retrieving play-by-play logs of real life games from the Internet (e.g., from Yahoo!, ESPN, Sports Illustrated, NFL.com, etc.).

The fantasy player module 125 then substitutes, based on the detecting step, the one or more fantasy sports players in the personnel package for one or more of the fantasy sports players in the default personnel package (Step 250). In one embodiment, the fantasy player module 125 sets, based on the detecting step, the active roster of the fantasy sports team (the fantasy players that accrue points) to be (or include) the players associated with the situational personnel package. Thus, the user's fantasy sports team accrues different points based on the different situations that occur in the real life sports game (due to the substitution of different personnel packages based on the different situations).

In one embodiment, the server computer 110 maintains a list of specific real life sports game situations for comparison with the specific situation. This list of specific real life sports game situations may include maintaining a list based on down and distance, field position, point differential, game clock, real team record, etc. For each special game situation, the owner would be able to insert a different lineup. In one embodiment, there is a limit on the number of substitutions allowed with respect to the default lineup (default personnel package).

In most cases, game situations will not overlap. If there are game situations that do overlap (e.g., $4^{th}$ and inches to goal, which is both "$4^{th}$ and inches" and "goal-line"), in one embodiment there is a priority rule indicating which personnel package trumps. For example, assume the Minnesota Vikings have a $4^{th}$ and inches to goal situation in a real game and that Adrian Peterson is on the fantasy team's "$4^{th}$ and inches" personnel package but is not on the fantasy team's "goal-line" personnel package. If the user indicates that the goal line personnel package trumps every other personnel package and Adrian Peterson carries the ball in the real game, the outcome of that carry is not accrued by the fantasy team. Had the user indicated the reverse preference (of "$4^{th}$ and inches" trumping every other package), Adrian Peterson's carry would have accrued. In one embodiment, the user sets the priority rule. The priority rule may also be set as a default. In one embodiment, the server 110 obtains a priority for situations in the list of specific real life sports game situations.

The user's fantasy sports team is then scored. This scoring includes the point accruals of each fantasy sports player that accrued points, limited to the real-life plays played by the player that correspond to game situations in which that player is on the active roster of the corresponding fantasy personnel packages. Scoring is calculated play-by-play. In one embodiment, for each real-life play in every real-life game, the game situation is determined and the fantasy personnel package used by each team in that situation is determined. Each team is credited for the play only if the players on the real field were included in the fantasy lineup for that game situation. Further, in one embodiment the fantasy player module 125 enables a user to analyze each player's performance according to the defined game situations. In one embodiment, the fantasy player module 125 provides a user's team with extra points when a player on a user's personnel package was substituted in and made a play in a real life game.

In another embodiment, the fantasy player module 125 is used in a fantasy basketball league. For example, there may be a personnel package associated with the last minute (or some predetermined time) of a basketball game. This personnel package may include, for example, 3 point shooters to substitute in at the end of a close game, players that are quick (e.g., guards) and/or players that are above a certain height (e.g., centers, power forwards, etc.). There may also be a personnel package associated with a game in which the score difference is greater than 25 points (so that a user can substitute in basketball players who do not play frequently but who may accumulate points during this time when the score difference is great).

In another embodiment, the fantasy player module 125 is used in a fantasy baseball league. For example, the fantasy player module 125 may provide a personnel package associated with the situation of being down by 1 run (or any number of predetermined runs) in the last inning (or any number of predetermined innings). This personnel package would likely include one or more pinch hitters and/or base running substitutions.

Figure 3:
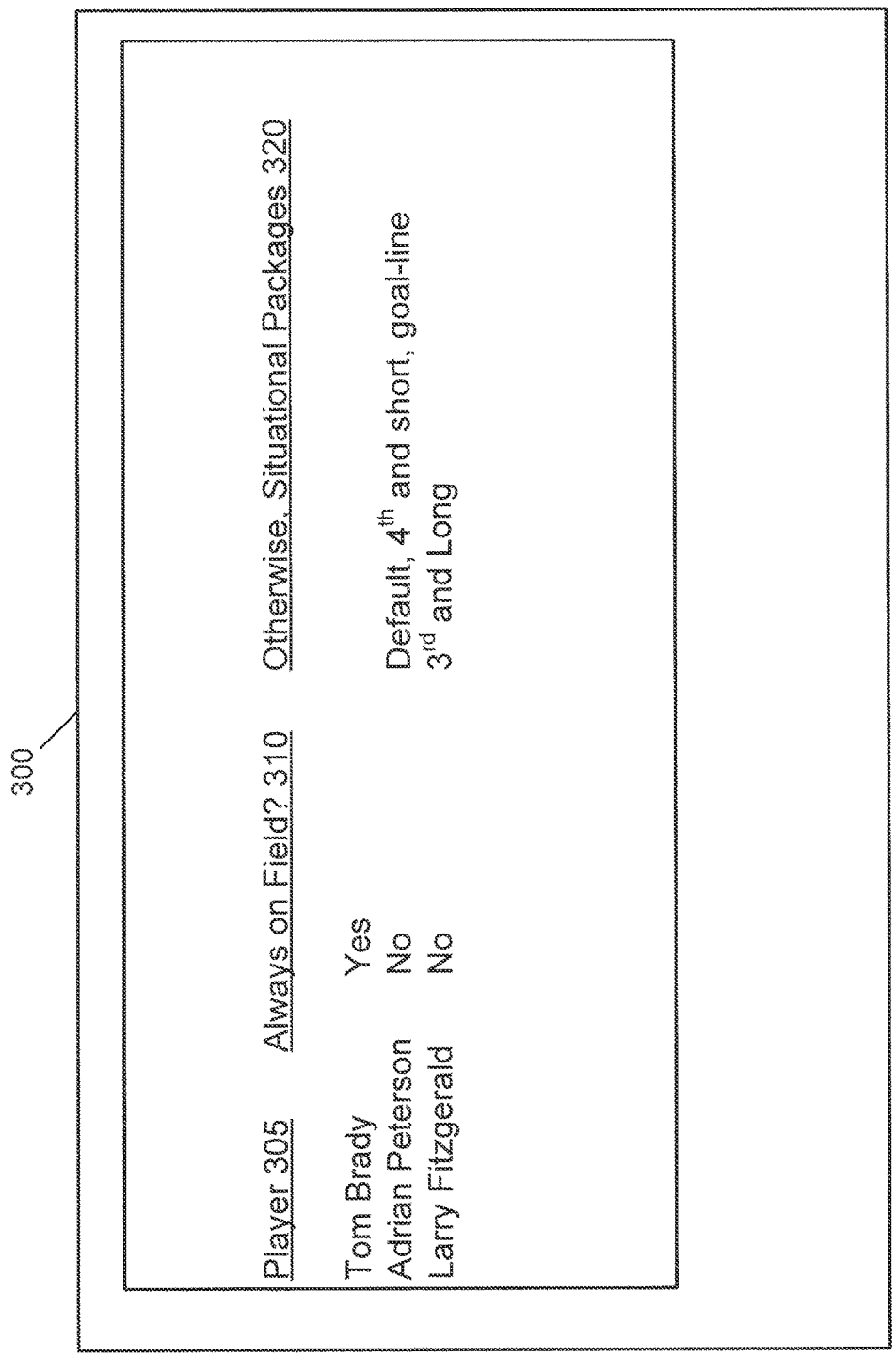
FIG. 3 is a block diagram of a user interface that lists players on a fantasy sports team in another embodiment of the present disclosure.

In one embodiment, instead of describing the fantasy team with respect to substitutions (as described above), each fantasy team can include a list of players and the game situations (default and/or specific) in which their real-life exploits accrue points. For example and referring to FIG. 3, user interface 300 displays a fantasy team with a list of players 305, an indication as to whether each player is always on the field 310, and, if not, what situational packages 320 the fantasy player is associated with. The player's position (or any other statistic or characteristic) can also be displayed. In the embodiment shown, Tom Brady is listed as always being on the field and therefore always accruing points for the fantasy team (and so, therefore, no situational package is listed for him). Adrian Peterson is listed as not always being on the field and being associated with a default package, a $4^{th}$ and short package, and a goal-line package. Thus, if a $4^{th}$ and short situation occurs in Peterson's real-life game, Adrian Peterson will accrue points for this fantasy team. Larry Fitzgerald is listed as not always being on the field and being associated with a $3^{rd}$ and long package. Thus, as Larry Fitzgerald is not associated with the default package and is only associated with a $3^{rd}$ and long package in this embodiment, if the real-life sports game in which Larry Fitzgerald is participating in is not in a $3^{rd}$ and long situation, Larry Fitzgerald will not accrue points for the fantasy team (regardless of what he actually does in his real life sports game). For any game situation (including default), there is the natural restriction that the amount and types/positions of associated players must correspond to fantasy league rules (e.g., you can't have two quarterbacks on the field at any time).

This user interface 300 can enable the user to quickly identify which fantasy players accrue points during different situations. The user interface 300 can also facilitate quickly determining scoring and how each player affects the team's score.

Figure 4:
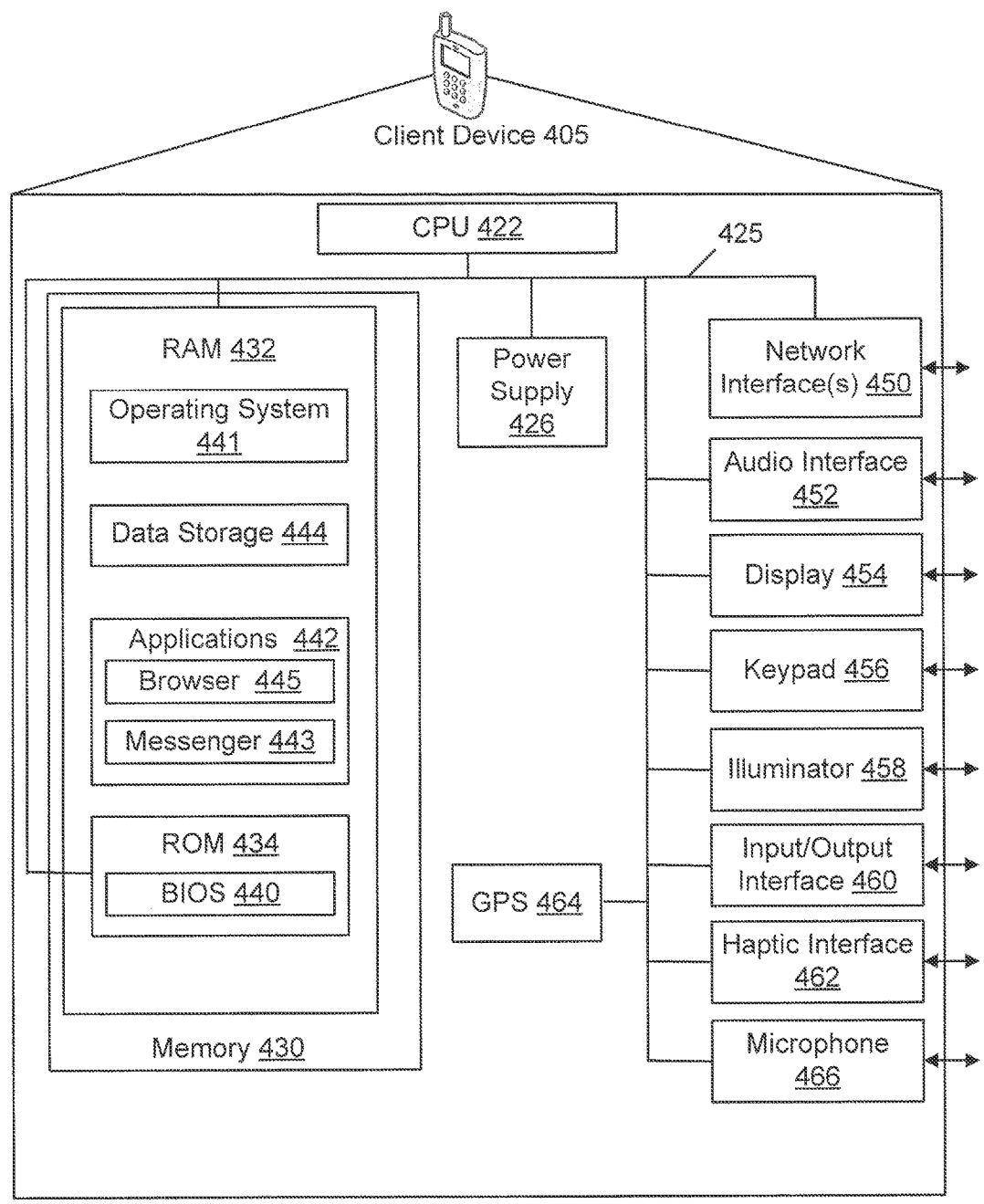
FIG. 4 depicts one example of a schematic diagram illustrating a client device in accordance with an embodiment of the present disclosure.

As shown in the example of FIG. 4, client device 405 may include one or more processing units (also referred to herein as CPUs) 422, which interface with at least one computer bus 425. A memory 430 can be persistent storage and interfaces with the computer bus 425. The memory 430 includes RAM 432 and ROM 434. ROM 434 includes a BIOS 440. Memory 430 interfaces with computer bus 425 so as to provide information stored in memory 430 to CPU 422 during execution of software programs such as an operating system 441, application programs 442, device drivers, and software modules 443, 445 that comprise program code, and/or computer-executable process steps, incorporating functionality described herein, e.g., one or more of process flows described herein. CPU 422 first loads computer-executable process steps from storage, e.g., memory 432, data storage medium/media 444, removable media drive, and/or other storage device. CPU 422 can then execute the stored process steps in order to execute the loaded computer-executable process steps. Stored data, e.g., data stored by a storage device, can be accessed by CPU 422 during the execution of computer-executable process steps.

Persistent storage medium/media 444 is a computer readable storage medium(s) that can be used to store software and data, e.g., an operating system and one or more application programs. Persistent storage medium/media 444 can also be used to store device drivers, such as one or more of a digital camera driver, monitor driver, printer driver, scanner driver, or other device drivers, web pages, content files, playlists and other files. Persistent storage medium/media 406 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 405 can also include one or more of a power supply 426, network interface 450, audio interface 452, a display 454 (e.g., a monitor or screen), keypad 456, illuminator 458, I/O interface 460, a haptic interface 462, a GPS 464, a microphone 466, a video camera, TV/radio tuner, audio/video capture card, sound card, analog audio input with A/D converter, modem, digital media input (HDMI, optical link), digital I/O ports (RS232, USB, FireWire, Thunderbolt), expansion slots (PCMCIA, ExpressCard, PCI, PCIe).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 5:
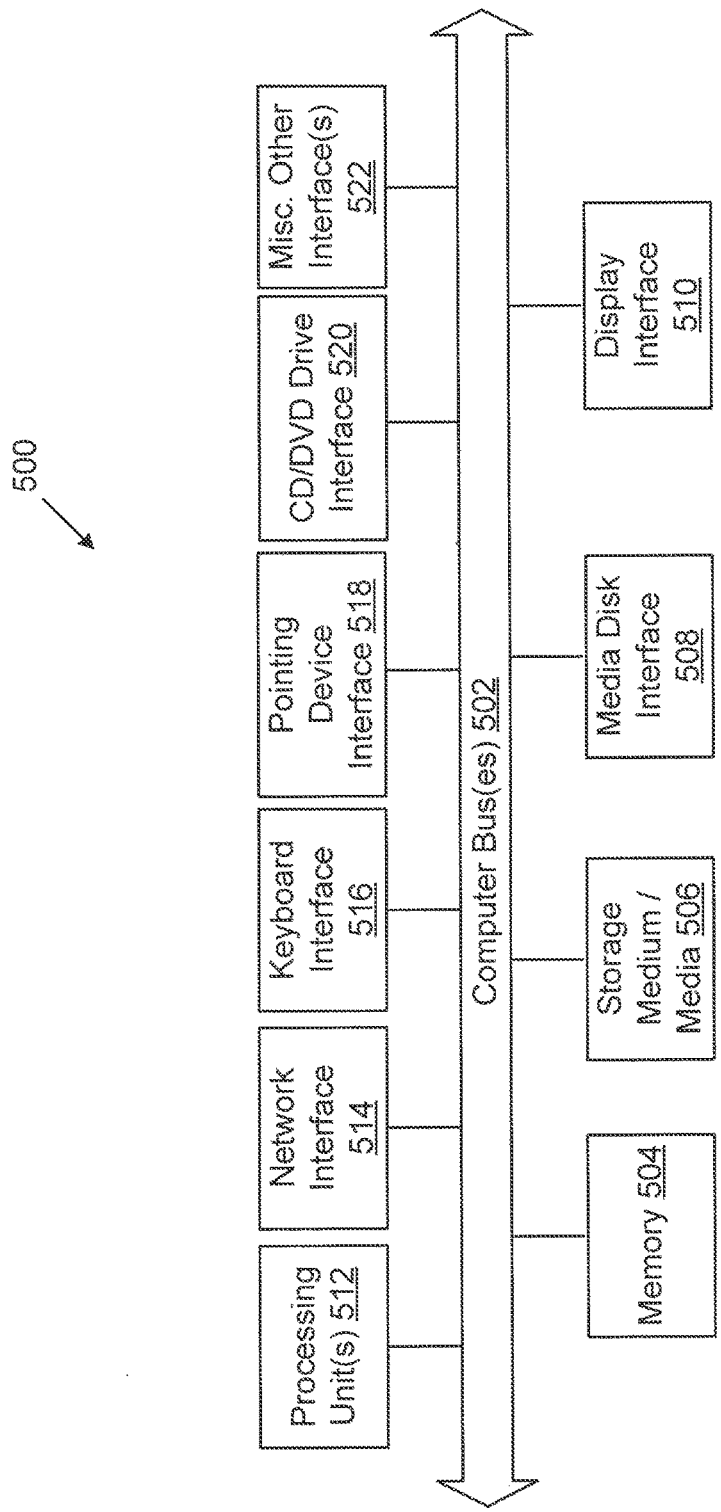
FIG. 5 is a block diagram illustrating an internal architecture of a computer in accordance with an embodiment of the present disclosure.

FIG. 5 is a block diagram illustrating an internal architecture of an example of a computer, such as server computer 110 and/or client device 105, in accordance with one or more embodiments of the present disclosure. A computer as referred to herein refers to any device with a processor capable of executing logic or coded instructions, and could be a server, personal computer, set top box, tablet, smart phone, pad computer or media device, to name a few such devices. As shown in the example of FIG. 5, internal architecture 500 includes one or more processing units (also referred to herein as CPUs) 512, which interface with at least one computer bus 502. Also interfacing with computer bus 502 are persistent storage medium/media 506, network interface 514, memory 504, e.g., random access memory (RAM), run-time transient memory, read only memory (ROM), etc., media disk drive interface 508 as an interface for a drive that can read and/or write to media including removable media such as floppy, CD-ROM, DVD, etc. media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces, a universal serial bus (USB) interface, and the like.

Memory 504 interfaces with computer bus 502 so as to provide information stored in memory 504 to CPU 512 during execution of software programs such as an operating system, application programs, device drivers, and software modules that comprise program code, and/or computer-executable process steps, incorporating functionality described herein, e.g., one or more of process flows described herein. CPU 512 first loads computer-executable process steps from storage, e.g., memory 504, storage medium/media 506, removable media drive, and/or other storage device. CPU 512 can then execute the stored process steps in order to execute the loaded computer-executable process steps. Stored data, e.g., data stored by a storage device, can be accessed by CPU 512 during the execution of computer-executable process steps.

As described above, persistent storage medium/media 506 is a computer readable storage medium(s) that can be used to store software and data, e.g., an operating system and one or more application programs. Persistent storage medium/media 506 can also be used to store device drivers, such as one or more of a digital camera driver, monitor driver, printer driver, scanner driver, or other device drivers, web pages, content files, playlists and other files. Persistent storage medium/media 506 can further include program modules and data files used to implement one or more embodiments of the present disclosure.

Internal architecture 500 of the computer can include (as stated above), a microphone, video camera, TV/radio tuner, audio/video capture card, sound card, analog audio input with A/D converter, modem, digital media input (HDMI, optical link), digital I/O ports (RS232, USB, FireWire, Thunderbolt), and/or expansion slots (PCMCIA, ExpressCard, PCI, PCIe).

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:

receiving, by a fantasy sports server, a plurality of personnel packages from a plurality of user associated client devices, each received personnel package comprising electronic information representing one or more fantasy sports players associated with a fantasy sports team of a respective user, each personnel package further comprising electronic data representing a specific situation that can occur within a real life sports game, each fantasy sports team having associated therewith a default personnel package comprising a set of said fantasy sports players;

storing and maintaining, by a fantasy sports server, said received plurality of personnel packages;

receiving and analyzing, by the fantasy sports server, broadcasts of real life sports games, each broadcast comprising electronic game data of a game currently being played, said analyzing comprising parsing, via the fantasy sports server, each broadcast of electronic game data, and based on said parsing, identifying a game situation within the respective real life sports game that has occurred;

analyzing, via the fantasy sports server, said stored personnel packages based on said identified game situation, said analysis comprising comparing said identified game situation against the specific situations identified in each personnel package, and determining, based on said comparison, a match;

substituting, via the fantasy sports server, one or more fantasy players based on said comparison and determined match, said substitution comprising:

substituting, when the identified game situation matches a plurality of specific situations within the stored personnel packages, one or more fantasy sports players in a first personnel package for one or more of the fantasy sports players in the default personnel package when the first personnel package has an assigned priority higher than a priority of each other received personnel package; and substituting, when the identified game situation matches only one specific situation within the stored personnel packages, one or more fantasy sports players in a second personnel package for one or more fantasy sports players in the default personnel package, the second personnel package having a higher priority than the other personnel packages for said one specific situation;

determining, by the fantasy sports server, a score for the fantasy sports team based on points accrued by all the fantasy sports players in the default personnel package and the substituted one or more fantasy sports players, said score based on accumulating how each identified game situation is scored according to said scoring in the default personnel package; and transmitting, by the fantasy sports server computer, the score to a client device of a first user for display on a graphical user interface (UI).

2. The method of claim 1, further comprising receiving, by the fantasy sports server from the first user operating the client device, an indication of the fantasy sports players in the personnel package.

3. The method of claim 1, further comprising receiving, by the fantasy sports server from the first user operating the client device, an indication of the specific situation associated with the personnel package.

4. The method of claim 1, wherein the specific real life sports game situation is a situation from a group of situations consisting of a third-and-long situation in a football game, a goal-line situation in a football game, and a $4^{th}$ and inches situation in a football game.

5. The method of claim 1, further comprising receiving, by the fantasy sports server from the first user operating the client device, the default personnel package, wherein the default personnel package comprises fantasy sports players that play unless the specific real life sports game situation occurs.

6. The method of claim 1, further comprising maintaining, by the fantasy sports server, a list of specific real life sports game situations for comparison with the specific situation.

7. The method of claim 6, wherein the maintaining of the list of specific real life sports game situations further comprises maintaining a list based on a situation from a group of situations consisting of down and distance, field position, point differential, game clock, and real team record.

8. The method of claim 1, wherein the determining of the score further comprises determining a fantasy player score based on each play in the real life sports game that a fantasy player is active.

9. The method of claim 1, wherein the determining of the score further comprises providing the fantasy sports team with extra points when the substituted one or more fantasy sports players in the personnel package makes a play in the real life sports game.

10. A fantasy sports server comprising:
a processor;
a non-transitory computer-readable storage medium for tangibly storing thereon program logic for execution by the processor, the program logic comprising:
logic executed by the processor for receiving, by a fantasy sports server, a plurality of personnel packages from a plurality of user associated client devices, each received personnel package comprising electronic information representing one or more fantasy sports players associated with a fantasy sports team of a respective user, each personnel package further comprising electronic data representing a specific situation that can occur within a real life sports game, each fantasy sports team having associated therewith a default personnel package comprising a set of said fantasy sports players;

logic executed by the processor for storing and maintaining, by a fantasy sports server, said received plurality of personnel packages;

logic executed by the processor for receiving and analyzing, by the fantasy sports server, broadcasts of real life sports games, each broadcast comprising electronic game data of a game currently being played, said analyzing comprising parsing, via the fantasy sports server, each broadcast of electronic game data, and based on said parsing, identifying a game situation within the respective real life sports game that has occurred;

logic executed by the processor for analyzing, via the fantasy sports server, said stored personnel packages based on said identified game situation, said analysis comprising comparing said identified game situation against the specific situations identified in each personnel package, and determining, based on said comparison, a match;

logic executed by the processor for substituting, via the fantasy sports server, one or more fantasy players based on said comparison and determined match, said substitution comprising:

logic executed by the processor for substituting, when the identified game situation matches a plurality of specific situations within the stored personnel packages, one or more fantasy sports players in a first personnel package for one or more of the fantasy sports players in the default personnel package when the first personnel package has an assigned priority higher than a priority of each other received personnel package; and logic executed by the processor for substituting, when the identified game situation matches only one specific situation within the stored personnel packages, one or more fantasy sports players in a second personnel package for one or more fantasy sports players in the default personnel package, the second personnel package having a higher priority than the other personnel packages for said one specific situation;

logic executed by the processor for determining, by the fantasy sports server, a score for the fantasy sports team based on points accrued by all the fantasy sports players in the default personnel package and the substituted one or more fantasy sports players, said score based on accumulating how each identified game situation is scored according to said scoring in the default personnel package; and logic executed by the processor for transmitting, by the fantasy sports server computer, the score to a client device of a first user for display on a graphical user interface (UI).

11. The fantasy sports server of claim 10, further comprising logic executed by the processor for receiving, from the first user operating the client device, an indication of the fantasy sports players in the personnel package.

12. The fantasy sports server of claim 10, further comprising logic executed by the processor for receiving, from the first user operating the client device, an indication of the specific situation associated with the personnel package.

13. The fantasy sports server of claim 10, further comprising logic executed by the processor for receiving, from the first user operating the client device, a default personnel package comprising fantasy sports players that play unless the specific real life sports game situation occurs.

14. The fantasy sports server of claim 10, further comprising logic executed by the processor for maintaining a list of specific real life sports game situations for comparison with the specific situation.

15. The fantasy sports server of claim 14, further comprising maintaining a list based on a situation from a group of situations consisting of down and distance, field position, point differential, game clock, and real team record.

16. The fantasy sports server of claim 14, further comprising obtaining logic for obtaining a priority for situations in the list of specific real life sports game situations.

17. The fantasy sports server of claim 10, further comprising determining logic for determining a fantasy player score based on each play in the real life sports game that a fantasy player is active.

18. The fantasy sports server of claim 10, further comprising providing logic executed by the processor for providing the fantasy sports team with extra points when the substituted one or more fantasy sports players in the personnel package makes a play in the real life sports game.

19. A non-transitory computer readable storage medium tangibly storing computer program instructions that when executed by a fantasy sports server, perform a method comprising:

receiving, by the fantasy sports server, a plurality of personnel packages from a plurality of user associated client devices, each received personnel package comprising electronic information representing one or more fantasy sports players associated with a fantasy sports team of a respective user, each personnel package further comprising electronic data representing a specific situation that can occur within a real life sports game, each fantasy sports team having associated therewith a default personnel package comprising a set of said fantasy sports players;

storing and maintaining, by a fantasy sports server, said received plurality of personnel packages;

receiving and analyzing, by the fantasy sports server, broadcasts of real life sports games, each broadcast comprising electronic game data of a game currently being played, said analyzing comprising parsing, via the fantasy sports server, each broadcast of electronic game data, and based on said parsing, identifying a game situation within the respective real life sports game that has occurred;

analyzing, via the fantasy sports server, said stored personnel packages based on said identified game situation, said analysis comprising comparing said identified game situation against the specific situations identified in each personnel package, and determining, based on said comparison, a match;

substituting, via the fantasy sports server, one or more fantasy players based on said comparison and determined match, said substitution comprising:

substituting, when the identified game situation matches a plurality of specific situations within the stored personnel packages, one or more fantasy sports players in a first personnel package for one or more of the fantasy sports players in the default personnel package when the first personnel package has an assigned priority higher than a priority of each other received personnel package; and substituting, when the identified game situation matches only one specific situation within the stored personnel packages, one or more fantasy sports players in a second personnel package for one or more fantasy sports players in the default personnel package, the second personnel package having a higher priority than the other personnel packages for said one specific situation;

determining, by the fantasy sports server, a score for the fantasy sports team based on points accrued by all the fantasy sports players in the default personnel package and the substituted one or more fantasy sports players, said score based on accumulating how each identified game situation is scored according to said scoring in the default personnel package; and transmitting, by the fantasy sports server computer, the score to a client device of a first user for display on a graphical user interface (UI).

* * * * *